US007542973B2

(12) United States Patent  
Segal et al.

(10) Patent No.: US 7,542,973 B2  
(45) Date of Patent: Jun. 2, 2009

(54) SYSTEM AND METHOD FOR PERFORMING CONFIGURABLE MATCHING OF SIMILAR DATA IN A DATA REPOSITORY

(75) Inventors: Anat Segal, Shelomi (IL); Ronen Cohen, Nahariya (IL)

(73) Assignee: SAP, Aktiengesellschaft, Waldorf (DE)

( * ) Notice: Subject to any disclaimer, the term of this patent is extended or adjusted under 35 U.S.C. 154(b) by 262 days.

(21) Appl. No.: 11/416,466

(22) Filed: May 1, 2006

(65) Prior Publication Data

US 2007/0276844 A1 Nov. 29, 2007

(51) Int. Cl.
*G06F 17/30* (2006.01)
*G06F 17/00* (2006.01)

(52) U.S. Cl. .................. 707/6; 707/2; 707/3; 707/4; 707/5; 707/7; 707/100; 707/102; 707/104.1

(58) Field of Classification Search ............ 707/2, 707/3, 5, 6, 7, 100, 102, 104.1, 4
See application file for complete search history.

(56) References Cited

U.S. PATENT DOCUMENTS

| | | | |
|---|---|---|---|
| 5,634,049 A | 5/1997 | Pitkin | |
| 5,933,836 A | 8/1999 | Gobat | |
| 6,026,398 A * | 2/2000 | Brown et al. ................ | 707/5 |
| 6,131,092 A * | 10/2000 | Masand ...................... | 707/6 |
| 6,286,000 B1 * | 9/2001 | Apte et al. .................. | 707/5 |
| 6,523,041 B1 * | 2/2003 | Morgan et al. .............. | 707/102 |
| 6,523,172 B1 * | 2/2003 | Martinez-Guerra et al. . | 717/143 |
| 6,631,365 B1 | 10/2003 | Neal et al. | |
| 6,747,643 B2 * | 6/2004 | Happel ....................... | 345/419 |
| 6,804,627 B1 | 10/2004 | Marokhovsky et al. | |
| 7,010,565 B2 * | 3/2006 | Sampson .................... | 709/202 |
| 7,039,635 B1 * | 5/2006 | Morgan et al. .............. | 707/4 |
| 7,043,492 B1 * | 5/2006 | Neal et al. .................. | 707/101 |
| 7,139,916 B2 * | 11/2006 | Billingsley et al. .......... | 713/182 |
| 2004/0024778 A1 * | 2/2004 | Cheo ......................... | 707/104.1 |
| 2004/0113927 A1 * | 6/2004 | Quinn et al. ................ | 345/700 |
| 2005/0055345 A1 * | 3/2005 | Ripley ........................ | 707/3 |
| 2005/0165566 A1 * | 7/2005 | Happel ....................... | 702/66 |
| 2005/0190273 A1 * | 9/2005 | Toyama et al. ............. | 348/231.5 |
| 2005/0192944 A1 * | 9/2005 | Flinchem .................... | 707/3 |
| 2006/0111893 A1 * | 5/2006 | Florian et al. ............... | 704/8 |
| 2006/0123036 A1 * | 6/2006 | Lawrence et al. ........... | 707/101 |
| 2006/0129541 A1 * | 6/2006 | Morgan et al. .............. | 707/3 |
| 2006/0167873 A1 * | 7/2006 | Degenaro et al. ............ | 707/6 |
| 2007/0060367 A1 * | 3/2007 | Heler ......................... | 463/42 |
| 2007/0150591 A1 * | 6/2007 | Kimura ...................... | 709/225 |

\* cited by examiner

*Primary Examiner*—Don Wong
*Assistant Examiner*—Thanh-Ha Dang
(74) *Attorney, Agent, or Firm*—Dalina Law Group P.C.

(57) ABSTRACT

Adaptive matching of similar data in a data repository to determine if two or more data items are related in accordance with configurable criteria. Matches are adapted by learning and presenting appropriate match criteria based on previous user input. The system can merge the data items into one master data item, group similar items and perform further processing based on the result. The configurable match criteria presented to a user are adapted by the system based on previous interactions of the system with users. Matching is performed by selecting data items to match, removing frequently used strings, normalizing data, tokenizing multiword data items, assigning weights to each token, calculating a score using the assigned weights, generating groups of similar records, assigning thresholds for match levels. Adapting choices of match criteria for a user based on past interaction allows for rapid match creation and match maintenance that optimizes data integrity across an enterprise.

20 Claims, 7 Drawing Sheets

FIGURE 2

| Vendor | | |
|---|---|---|
| Local Vendor ID | ZHH10 | ZHH10 |
| Source System ID | CBS | CBS |
| Name 1 | HEXATRONIC ELEKTRONIK & DATA AB | HEXATRONIC ELEKTRONIK & DATA AB |
| Search Term 1 | DELETED | HEXATSE |
| Street | EXPORTGATAN 47B | EXPORTGATAN 47B |
| City | Hisings Backa | Hisings Backa |
| City Postal Code | 42246 | 42246 |
| Country | SWEDEN | SWEDEN |
| Account Group | 0000 | 0000 |
| Create Date | 01/22/2006 19:04:00 | 01/22/2006 19:04:01 |
| Updated By | Admin | Admin |
| Update Date | 01/22/2006 19:13:17 | 01/22/2006 19:13:17 |
| Group | 82.Score.ZC29_1; 82.Score.20396_2; 91.Score.ZHH10 | 82.Score.ZC29_2; 82.Score.20396_3; 91.Score.ZHH10 |
| Name_N | HEXATRONIC ELEKTRONIK DATA | HEXATRONIC ELEKTRONIK DATA |
| Name_1T_N | HEXATRONIC | HEXATRONIC |
| Name_2T_N | ELEKTRONIK | ELEKTRONIK |
| Name_3T_N | DATA | DATA |
| Street_N | EXPORTGATAN 47B | EXPORTGATAN 47B |
| Street_1T_N | EXPORTGATAN | EXPORTGATAN |
| Street_2T_N | 47B | 47B |
| City_N | HISINGS BACKA | HISINGS BACKA |
| Last Match Date | 01/25/2006 14:38:18 | 01/25/2006 14:38:18 |
| Match Processed | Yes | Yes |
| Group Processed | Yes | Yes |
| Phone | (031)7425530 | (031)7425530 |
| Fax | | +4631585930 |
| Match Score | Vendor Number:20396; Rate Name_21_N:5; Score:82 Vendor Number:ZC29; Rate Name_21_N:5; Score:82 Vendor Number:ZH685; Rate Name_1T_N:25; Rate Name_21_N:5; Rate Name_3T_N:5; Rate Street_1T_N:25; Rate Street_2T_N:5; Rate City_N:15; Rate Postal Code:20; Score:91 | Vendor Number:20396; Rate Name_21_N:5; Score:82 Vendor Number:ZC29; Rate Name_21_N:5; Score:82 Vendor Number:ZHH10; Rate Name_1T_N:25; Rate Name_21_N:5; Rate Name_3T_N:5; Rate Street_1T_N:25; Rate Street_2T_N:5; Rate City_N:15; Rate Postal Code:20; Score:91 |

FIGURE 3

| Search Parameters | | | |
|---|---|---|---|
| Source System ID | | | |
| Country | | | |
| Account Group | | | |
| Commodity Group | | | |
| Commodity Group | | | |
| Commodity | | | |
| Preferred Vendor | | | |
| Global Vendor Gro | | | |

| Compare Records | Records | | |
|---|---|---|---|
| Vendor | | Matched / Local Vendor ID / Source System ID | Name 1 |
| Local Vendor ID | Z231471A | | ZNE45 |
| Source System ID | CB5 | | CB5 |
| Name 1 | HARMONY CASTING LLC | | HARMONY CASTINGS INC |
| Search Term 1 | DFI FTFD | | DFI FTFD |
| Street | 251 PERRY HWY | | 251 PERRY HWY |
| City | Harmony | | Harmony |
| City Postal Code | 16037 | | 16037-0230 |
| Country | UNITED STATES | | UNITED STATES |
| Account Group | 0000 | | 0000 |
| Create Date | 01/22/2006 19:03:56 | | 01/22/2006 19:04:02 |
| Updated By | Admin | | Admin |
| Update Date | 01/22/2006 19:13:17 | | 01/22/2006 19:13:17 |

| Group | |
|---|---|
| 86. Score.ZGOLF | |
| 88. Score.Z10231 | |
| 88. Score.Z10231 | |
| 88. Score.Z10231 | |
| 88. Score.Z10231 | |
| 88. Score.Z10239 | |
| 88. Score.Z3772 | |
| 88. Score.Z10232 | |
| 89. Score.Z23147 | |
| 89. Score.Z3772 | |
| 90. Score.Z10231 | |

| | Local Vendor | Matched | Source System ID | Name 1 |
|---|---|---|---|---|
| | Z202361A | | CBS | HAMMACK AUDIO VIDEO SOLUTIONS, INC. |
| | Z232368A | | CBS | HAVS, INC. |

Search Parameters
- Source System ID
- Country
- Account Group
- Commodity Group Spend Area
- Commodity Group
- Commodity
- Preferred Vendor
- Global Vendor Group ID

Group
- 84.Score.ZZ210_1
- 85.Score.Z102315A
- 85.Score.Z102343A
- 85.Score.Z102410A
- 85.Score.Z201823A
- 85.Score.Z202361A
- 85.Score.ZC29
- 85.Score.ZGOLF
- 86.Score.Z102315F
- 86.Score.Z102315J
- 86.Score.ZCB52

Record Detail | Validations | Workflows | Search Sele

| Local Vendor ID | Z202361A |
|---|---|
| Source System ID | CBS |
| Name 1 | HAMMACK AUDIO VIDEO |
| Name 2 | |
| Search Term 1 | DELETED |
| Search Term 2 | |
| Street | PO BOX 711822 |
| House Number | |
| City | Santee |
| City Postal Code | 92072 |
| PO Box | |

Match Score [2 of 2]

Z232368A
ZZ0

☑ Filter

Vendor Number: Z232368A 25
Rate Street_1T_N: 15
Rate City_N: 85
Score:

| | | |
|---|---|---|
| Local Vendor ID | Z202361A | Z232368A |
| Source System ID | CB5 | CB5 |
| Name 1 | HAMMACK AUDIO VIDEO SOLUTIONS, INC. | HAV5, INC. |
| Search Term 1 | DELETED | DELETED |
| Street | PO BOX 711822 | PO BOX 711822 |
| City | Santee | Santee |
| City Postal Code | 92072 | 92072-1822 |
| Country | UNITED STATES | UNITED STATES |
| Group | 82.Score.Z202361A_1; 85.Score.Z202361A | 85.Score.Z202361A |
| Name_N | HAMMACK AUDIO VIDEO SOLUTIONS | HAV5 |
| Name_1T_N | HAMMACK | HAV5 |
| Name_2T_N | AUDIO | |
| Name_3T_N | VIDEO | |
| Street_N | 711822 | 711822 |
| Street_1T_N | 711822 | 711822 |
| City_N | SANTEE | SANTEE |
| Last Match Date | 01/25/2006 14:38:18 | 01/25/2006 14:38:18 |
| Match Processed | Yes | Yes |
| Group Processed | Yes | Yes |
| Phone | 619 258 6700 | 619-588-6300 |
| Match Score | Vendor Number:Z232368A; Rate Street_1T_N:25; Rate City_N:15; Score:85 Vendor Number:ZZ099; Rate Name_3T_N:5; Score:82 | Vendor Number:Z202361A; Rate Street_1T_N:25; Rate City_N:15; Score:85 |

SYSTEM AND METHOD FOR PERFORMING CONFIGURABLE MATCHING OF SIMILAR DATA IN A DATA REPOSITORY

BACKGROUND OF THE INVENTION

1. Field of the Invention

Embodiments of the invention described herein pertain to the field of computer systems and software. More particularly, but not by way of limitation, one or more embodiments of the invention enable systems and methods for adaptive matching of similar data in a data repository to determine if two or more data items are related in accordance with configurable criteria and to learn which match criteria settings are appropriate based on previous user input or results.

2. Description of the Related Art

Use of large data repositories in making business decisions is a common strategy employed by successful businesses. Successful businesses have a need for business data that is as accurate as possible to allow effective business decisions to be made. When the data in these systems is not consistent, problems arise. Keeping data consistent across multiple distributed enterprise-wide computer systems is non-trivial. Establishing effective communication links between heterogeneous systems is the first step for making the data consistent. However, simply allowing all computer systems within an organization to communicate does not solve the problem. Even when data is shared throughout an enterprise, problems still arise since data may exist in different forms in different locations within the enterprise. Since the goal of absolutely accurate data is elusive, it is common for companies to maintain data in independent computer systems. For example, because of the difficulties associated with identifying and matching similar data, some companies maintain data for each corporate division in independent computational zones and only utilize such data within a division to make a business decision associated with that particular division. It is common after one company acquires another company for the computer systems of each company to remain autonomous. Thus, the possibility of identifying and matching common data items within each repository is generally very low.

To solve the problem of having data in multiple similar forms, businesses attempt to identify similar data and integrate the data in a way that ensures the data remains consistent. Performing the integration is difficult and breaks down when new corporate computer systems are added through acquisition or changes in business systems and software occur. One method that is used by some organizations is to maintain "master data". Master data for example may be an organization's ideal form of a data item. Solutions for keeping the data consistent through the organization, i.e., propagating master data throughout the organization, are generally non-robust and brute force communication schemes that do not allow new data entries to be matched against existing data items to effectuate data consolidation at data entry time.

The inability to keep master data items consistent harms an organization's ability to leverage its assets and lower the cost of doing business. All areas of a business are affected by the inability to keep data as accurately as is possible. In summary, existing computer systems and methods lack effective mechanisms for performing data matching in a way that allows the system to learn when data matches are appropriate. For example, existing systems and methods do not have an ability to learn and consolidate two data items that originally where thought to be independent, but which have been matched above a threshold. The ability to learn which patterns in data are actually indicative of a match between two data items is not found in existing enterprise computing solutions.

Because of the limitations described above there is a need for a system and method for adaptive matching of similar data in a data repository.

SUMMARY OF THE INVENTION

One or more embodiments of the invention are directed to systems and methods for adaptively matching similar data in a data repository to determine if two or more data items are related in accordance with configurable criteria and to learn which matches are appropriate and adapt the match criteria based on previous user input or algorithms. Once a set of two or more items is determined to be similar, the system can merge the data items into one master data item, group similar items and perform further processing based on the result. The configurable match criteria are adapted by the system based on previous interactions of the system with users. A computer program product for adaptive matching of similar data in a data repository comprising a computer usable memory medium having computer readable program code embodied therein wherein said computer readable program code comprises a matching executable unit. A system for adaptive matching of similar data in a data respository.

An embodiment of the invention that is able to perform adaptive matching initiates by presenting data elements or fields from at least two records and obtaining selections from a user about which elements or fields appropriately match. Removing frequently used characters and strings, for example "Street", "Str.", "St.", "A", "The", etc., is performed to limit the portions of the data items to compare to a smaller set. Normalizing data is also performed in order to cleanse strings. For example, "California", "Calif.", "Cal.", may be converted to "CA." The system may then perform tokenizing of multi-word text based data items to enable the comparison of individual tokens respective or irrespective of position. Assigning weights to each field or token is performed in one or more embodiments of the invention in order to provide for an eventual match score that takes into account the greater or lesser relevance of a match. Systems can also calculate a score based on the summation of the assigned weights for each matching field or token. Once similar records are identified (e.g., those above a certain threshold score) the system generates groups of similar records to allow for the display of these records in relation to one another so that a decision can be made by the user and thereafter learned by the system for future use. The user and/or the system may assign thresholds for given records to determine when a match is a duplicate requiring no further user intervention. This allows records that have similar tokens to auto-match in future cases so that a user is not required to intervene in the matching process when a particular match score is achieved. The matching thresholds may be table specific or based on a field or value in a field for example.

Each of the steps implementing an embodiment of the system may utilize past user input to provide intelligent choices to the user for streamlining subsequent matching operations. For example, adapting the choices that are provided to a user based on past user input allows match parameters to be configured in rapid fashion. Furthermore, normalization rules may be implemented for a match in varying form based on the data sources and the geography where the normalization has occurred in the past. This for example allows the system to prioritize regional specific or language specific choices for user selection that are more appropriate for a given region.

The ability for the system to learn which tokens are relevant and when they are relevant in a particular order allows the system to present token lists limited by interactions with previous users. Based on previous user input, the system is configured to learn for a given match whether to compare two records using all tokens in a given comparison field regardless of position or whether to compare all tokens irrespective of position for the comparison field. This allows the system to construct further matches that take advantage of previous user inputs and provides a mechanism for the system to provide better choices to a user for creation of a new match.

The system is also configured in one or more embodiments of the invention to learn weights for tokens as previously gathered from user interactions. Hence the system may provide lists or ranges of weights that previous been identified as confirmed matches in order to guide the user in creating a new match. The weights may be specific to particular groups of data or elements in various data sources. For example, a postal code may have a high weight in one match type and a low weight for a different match based on a different set of compared records or fields. The system is configured to present the weights for tokens that make sense for the data that is being matched. This allows the system to present choices to a user that minimize the amount of time that a user must interact with the system to define a match. The matches may be applied to any record and field in any table of a corporate database.

BRIEF DESCRIPTION OF THE DRAWINGS

FIG. 2 illustrates a compare records window shown by double-clicking a match group.

FIG. 3 shows a compare records window with a field that has two values for two different records within a match group.

FIG. 4 shows an embodiment of the invention that displays match criteria with a tooltip using the mouse for a selected record within a match group.

FIG. 5 shows the record by record comparison of records in the match group selected in FIG. 4.

DETAILED DESCRIPTION OF THE INVENTION

A system and method for adaptive matching of similar data in a data repository is now described by way of example. In the following description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
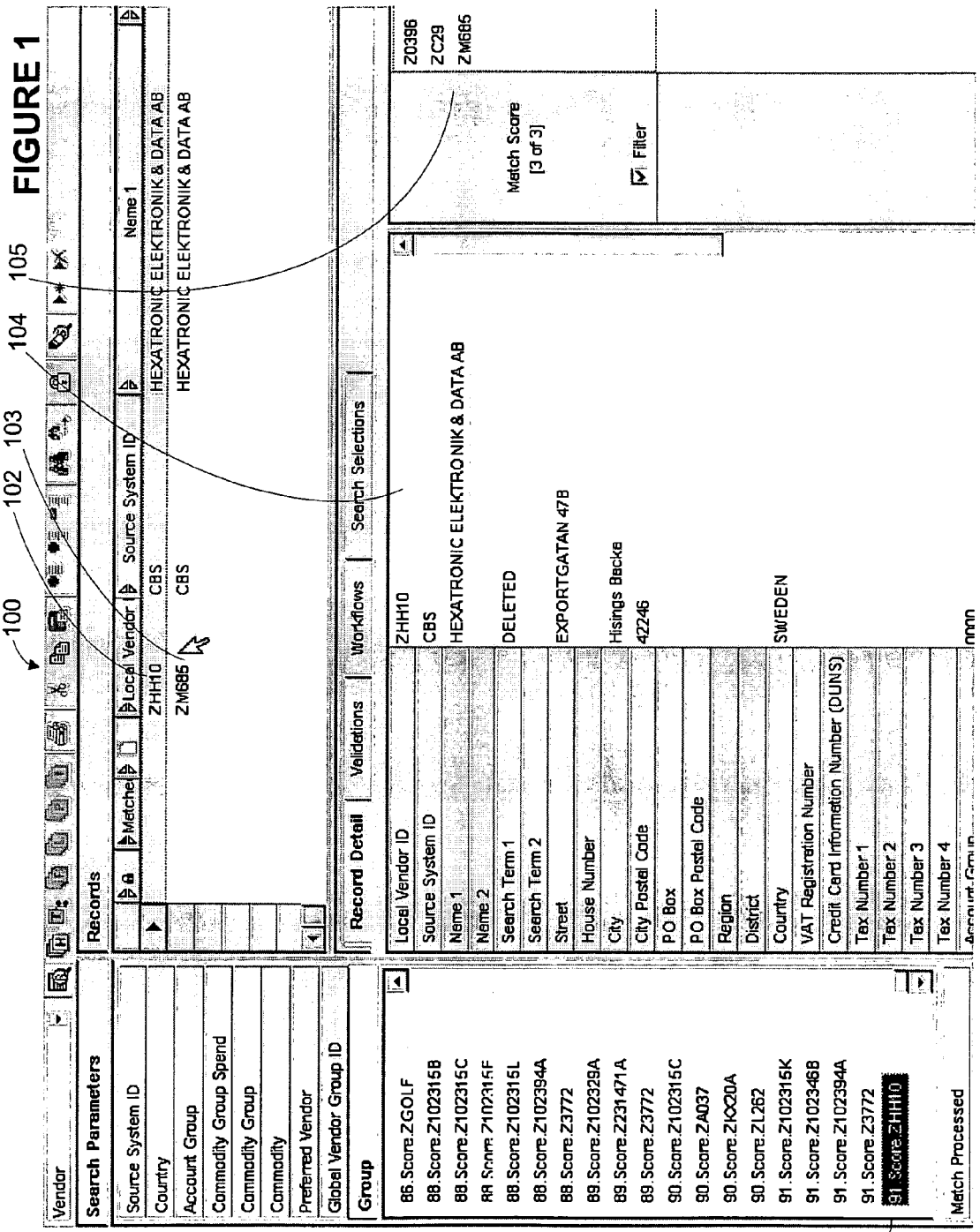
FIG. 1 shows an example graphical user interface that displays an embodiment of the invention.

FIG. 1 shows an example graphical user interface that displays an embodiment of the invention 100. Match group 101 comprises vendor identifier "ZHH10" with a prepended match score of "91". Match group 101 is selected and is shown as highlighted in the list. The records that belong to the selected match group are shown in the Records window or area in the upper right portion of the display. Record with vendor identifier "ZHH10" is shown along with other records that belong to match group 101, e.g., record 103. The selected record in the Records window is shown in the Record Detail window, which is also referred to as the record detail "area" in the lower right portion of the display. Shown in record detail area 104 is record 102 in a vertical format. Match score records that match the selected record in the Records area are shown in match score area 105. This list of records is similar to record 102, but may not be similar enough to record 103 to be listed if that record was selected in the Records area. By double-clicking group 101, a compare records window is displayed for the user as shown in FIG. 2. Side by side views of each record in the group allow for differing fields to be displayed for example in different colors. Each field of record 102 and 103 are shown side by side and since a set of match criteria may be set up that puts greater weight on different fields or on different tokens within each of the fields, a match may become more accurate over time as the match criteria are adjusted and learned by the system. In one or more embodiments of the invention, the system aides a user when defining a match by presenting fields and tokens and orders of tokens that are prioritized in order to allow a user to define the match rapidly. For example, in one or more embodiments of the invention, the system presents a list of choices of tokens and match orders of tokens for fields that has been previously used as part of a search. The list may then change as the user adds more fields to the match, in which case the combination of weights for a match with a particular set of fields may be completely different than a match that excludes a given field. In this manner the system takes advantages of choices that users have made in the past in developing a new match.

FIG. 3 shows a field 300 "Name 1" that has two values for two different records within a match group. Record with Vendor ID "Z231471A" and Vendor ID "ZNE45" have slightly different values in field "Name 1" that a standard match algorithm would find as a non-match. An embodiment of the invention tokenizes the field and can be configured to match any number of tokens in either the original order or in any order. In this particular example, a data entry error or out of date information exists in one record or the other. In one case, a data entry person may have assumed that the company was an "INC.", when in fact it was an "LLC" or visa versa. In the other case, the entity name could have changed over time from an "LLC" to an "INC." In either case, in order to harmonize data, one record or the other is changed to be consistent with the other and with the true value that should exist in the field. Once this value is identified, future matches may learn from this accepted rule and automatically execute functionality that ignores differences in entity type when calculating a match. In addition, the system may change an "LLC" to an "INC." or visa versa to create master data. By adapting the match criteria to include decisions that previous users have made when creating match rules, the system improves match rule creation by making it faster and more accurate.

FIG. 4 shows an embodiment of the invention with tooltip 401 displaying the match criteria for record with Vendor ID "Z232368A" when the mouse is over this Vendor ID in the Match Score portion of the display. The match criteria tool tip shows the fields and resulting weight summations and resulting score for the given Vendor ID with respect to the selected match group 402, e.g., "85.Z202361A." In one or more embodiments of the invention, the match score area shows the same tooltip as the Records area in the top right portion of the screen when the mouse is over the same record in that window. One or more embodiments of a match score tooltip shows the fields and the number and order of tokens along with the weighted scores for each portion of the match. FIG. 5 shows the record by record comparison of the two records in the top of the Records area. The "Name 1" field shows that records with entirely different representations of a company may still match in other portions of the record and flag the "Name 1" field as a field that requires user input. In this case, one name is an acronym for the field in the other record, e.g., "HAMMAC AUDIO VIDEO . . . " versus "HAV". The system may learn synonyms with respect to a given field and may use these synonyms to normalize the data in an adaptive manner to negate the need for user intervention. The Group field shows that the left record matches in two groups while the right record in the figure matches in only one group. See ninth row from top of the display. In this case, the record shown on the left side of the window is "closer to" more records than the record shown on the right side of the window.

Figure 7:
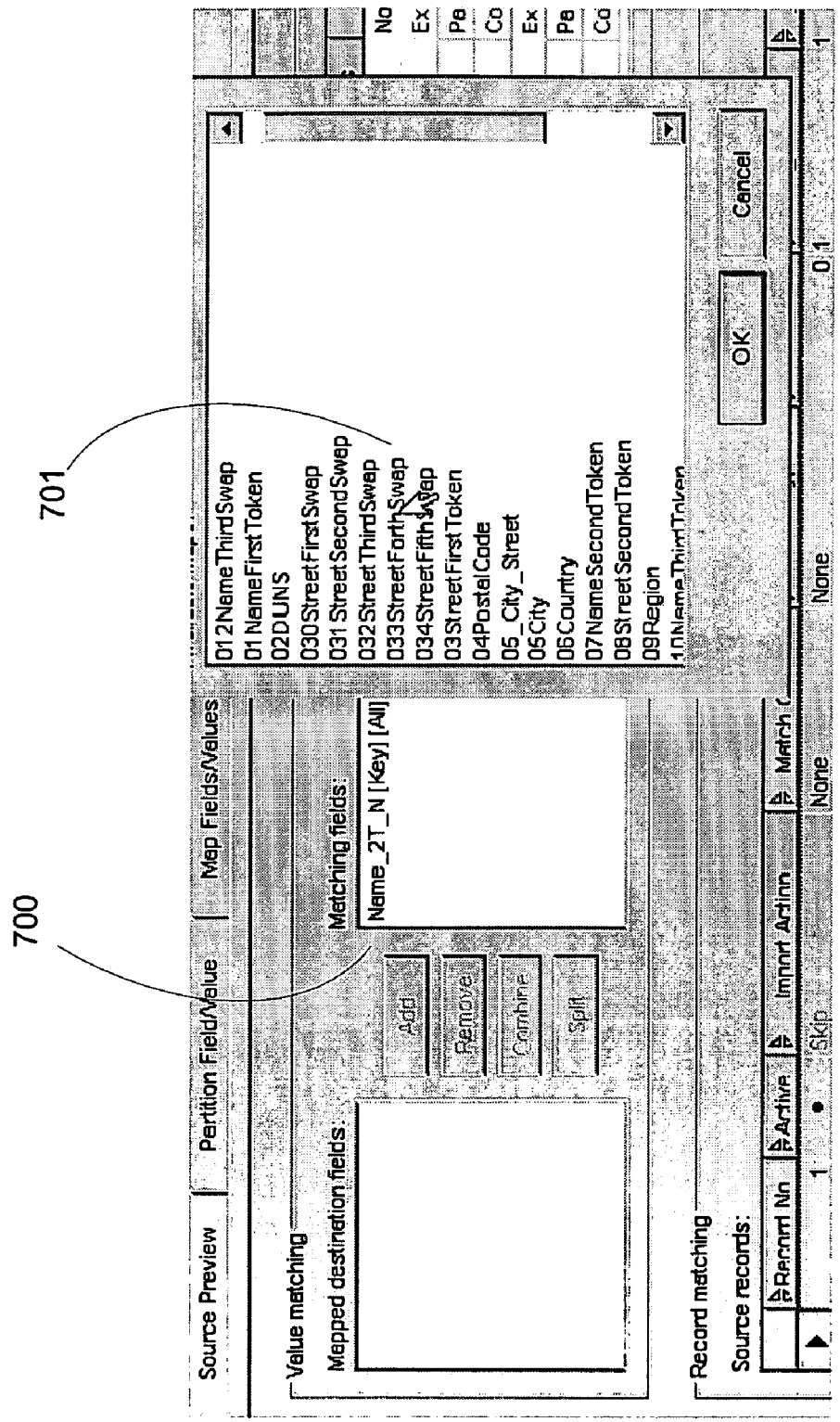
FIG. 7 shows a display having a matching fields list with a selection box for selecting fields and tokens and the order in which tokens signify match.

An embodiment of a system for adaptive matching begins by presenting data elements or fields from which to match between two records and obtaining selections from a user. FIG. 7 shows a display having a matching fields list 700 with a field "Name_2T_N" that is a "[Key]" field and a token value of "[All]" which signifies that all tokens of the field must match. Embodiments of the invention present fields from which to select in order to perform a match. In addition, portions of a field listed by token may also be presented as shown in selection window 701 with "033StreetForthSwap" signifying that the "Street" field "Forth" token may match in field in "Swap" order, i.e., the forth token does not have to match a token from the fourth field in another record.

In one or more embodiments of the invention, tokenizing multi-word text based data items is performed to enable the comparison of individual tokens irrespective of position. Removing frequently used characters and strings, for example "Street", "Str.", "St.", "A", "The", etc., is performed to limit the portions of the data items to compare to a smaller set. Excluding characters that are non-essential to the match is performed. For example, the system may selectively exclude the following characters from a field that is being matched between two records: PERIOD, QUOTE, DASH, COMMA, LEFT PAREN, RIGHT PAREN, SLASH, BACKWARD SLASH, PLUS, MINUS, STAR, AMPERSAND, BLANK, TAB, NUMBER SIGN. For example, PERIOD is a textual character represented by ".". Any other character may be added to or removed from the list of excluded characters for a given match. Results of previous user selections involving the fields of the present match may be stored by the system in order to learn what types of characters are excluded from matches that involve the particular field.

Figure 6:
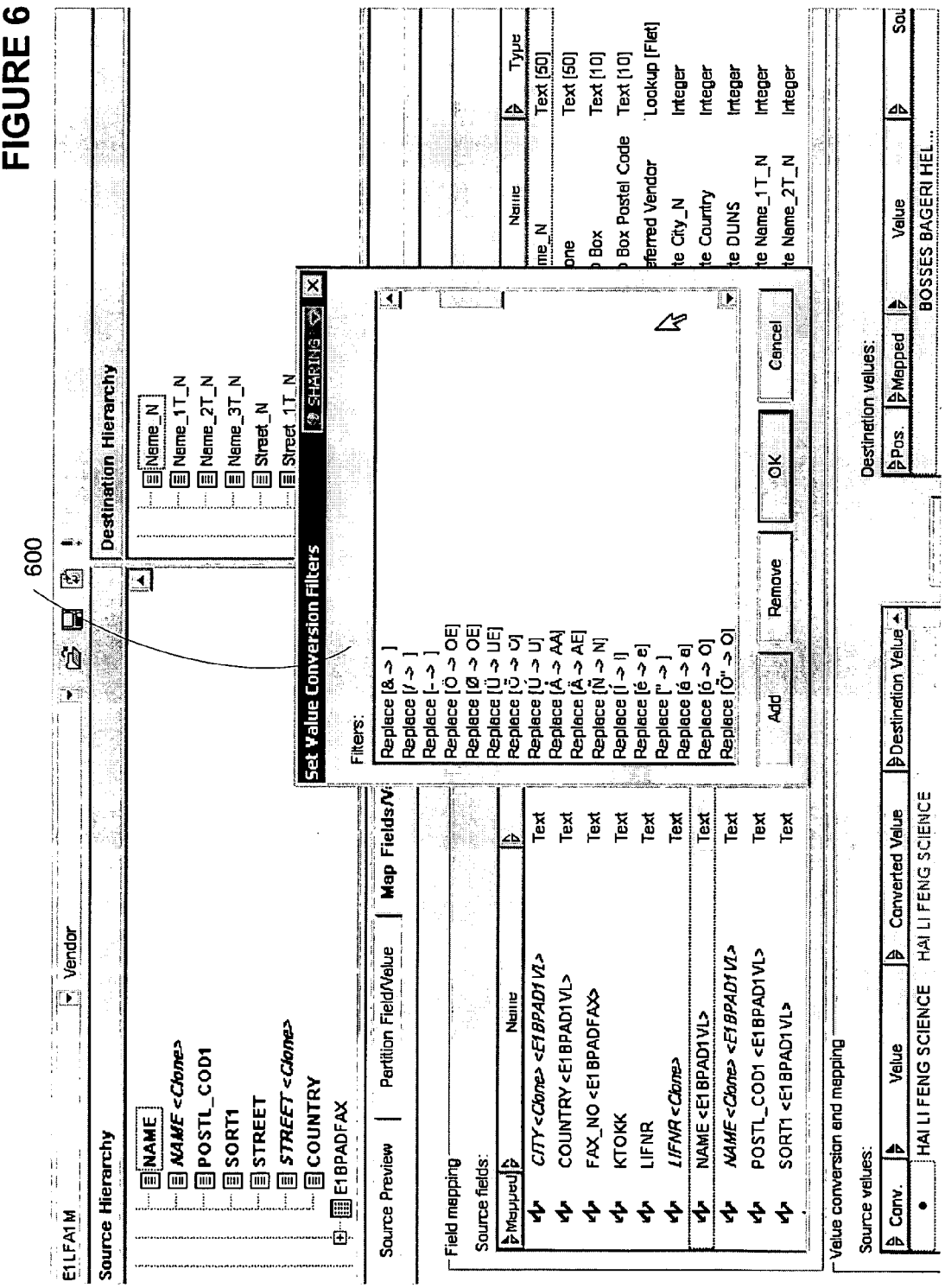
FIG. 6 shows an embodiment of the invention that implements substitution of characters.

Normalizing data is performed in order to cleanse strings. For example, tokens may be substituted for one another, e.g., "California", "Calif.", "Cal.", are converted to "CA." Normalization may also include substituting characters. FIG. 6 shows an embodiment of the invention that implements substitution of characters. For example, the system may convert characters from foreign languages to base ASCII form, i.e., Ö to OE, Ø to OE, Ä to AE, Å to AA, Ü to UE, Í to I, etc. Removal of non-name tokens may also take place. For example, the system may remove the following non-name tokens before attempting a match: AB, INC, LLC, CORP, LTD, SA, AS, SACI, BV, SARL, KK, SPA, AG, LTDA, APS, PTY, PLC, LLP, LLC, GMBH, SDN BHD, (DO NOT USE!), SAS, DE, EDI, DV, SAU, HB, KB, SP200, SRL, KFT, BEIJING, NANJING, CHONGQING, GUANGZHOU, SVENSKA, SVERIGES.

Although the above substitutions and normalizations may be configured to occur on the Vendor Name portion of a match. An entirely different set of exclusions and normalizations may occur on another field to be matched. For example, a Postal Code field may simple normalized by excluding BLANK characters. Results of previous user selections involving each field for a match may and in general are different. The selections are stored by the system in order to learn what types of characters are excluded from matches and what normalizations occur for a particular match involving a particular field.

Assigning weights to each field or token is then performed in order to provide for an eventual match score that takes into account the greater or lesser relevance of a match. Calculating a score based on the summation of the assigned weights for each matching field or token is then performed. An example weighting for a match is shown below:

| Field | Weight | Explanation Comment | Tokens |
|---|---|---|---|
| Vendor name | +25 | For first match of Name token | 3 - with swapping |
|  | +10 | For each additional match of Name token |  |
| Address | +15 | For first of Address Token | 5 - without swapping |
|  | +5 | For each additional match of Address Token |  |
| Postal Code | +15 |  | 0 |
| City | +10 | Assign weight only if Name $1^{st}$ token or Address $1^{st}$ token match | 0 |
| Region | +5 | Assign weight only if Name $1^{st}$ token or Address $1^{st}$ token match | 0 |
| Country | −30 | If no match and Name $1^{st}$ token matches, else + 0 | 0 |
| DUNS number | +50 |  | 0 |
| Tax Number | +50 |  | 0 |

In this example, Vendor Name has been defined as requiring 3 tokens that may be matched with swapping, i.e., in any order. A zero in the tokens column may signify that only the first token need match in one or more embodiments of the invention. The match can also be specified as requiring tokens to match in order (i.e., without swapping) as is shown in the Address field match in the second row of the table. The presentation of a table such as is shown above or as an element of a graphical user interface is in keeping with the spirit of the invention. Any other method of displaying the fields, their weights and the tokens and number and order of token matches required for a match may be utilized including but not limited to displaying the data in lists, trees or any other graphical user interface component. In addition, the initial presentation of the information related to a match may utilize data that has been learned by the system from previous interactions with users that utilize given fields in creating match criteria. Furthermore, the weight values used may apply to first or subsequent matches within a field and may have different values for the first or subsequent token matches within the field. Presentation of a list for a match that is being constructed by a user with values pre-assigned as learned by embodiments of the system saves the user from re-inventing the match.

Generating groups of similar records is then performed to allow for the display of these records in relation to one another so that a decision can be made and thereafter learned by the system for future use. Assigning thresholds for given records to determine when a match is a duplicate requiring no further user intervention is performed. This allows for records that have similar tokens to auto-match for all future testing so that a user is not required to intervene in the matching process when a particular match score is achieved. The matching thresholds may be table specific or based on a field or value in a field for example.

Each of the steps implementing an embodiment of the method may utilize past user input to provide choices to the user for streamlining subsequent matching operations. For example, adapting the choices that are provided to a user based on past user input allows for match parameters to be configured in rapid fashion. Furthermore, normalization rules may be presented in varying form based on the data sources and the geography where the normalization has occurred in the past and is to occur during the current match.

The ability to learn which tokens are relevant and when they are relevant in a particular order allows for the system to present token lists that are limited by system interactions with previous users. Based on previous user input, the system is configured to learn for a given match whether to compare all tokens in a field regardless of position with a first token of a test field or whether to compare all tokens within both fields irrespective of position. This allows for the construction of further matches that take advantage of previous user inputs in providing choices to a user for creation of a new match.

The system also learns weights for tokens as previously gathered from user interactions and may provide lists or ranges of weights that previous matches have used in order to guide the user in creating a new match. The weights may be specific to particular groups of data or elements in various data sources. For example, a postal code may have a high weight in one match type and a low weight for a different match based on a different set of compared records or fields. The system is configured to present the weights for tokens that make sense for the data that is being matched. This allows for the presentation of choices to a user that minimizes the amount of time that a user must interact with the system to define a match. The matches may be applied to any record and field in any table of a corporate database.

While the invention herein disclosed has been described by means of specific embodiments and applications thereof, numerous modifications and variations could be made thereto by those skilled in the art without departing from the scope of the invention set forth in the claims.

What is claimed is:

1. A computer program product for adaptive matching of records in a data repository comprising:
   a computer usable memory medium having computer readable program code embodied therein wherein said computer readable program code comprises a matching executable unit configured to:
   present at least one field common to a first record and a second record wherein said at least one field is used to perform a match between said first record and said second record and wherein said at least one field is presented to a user;
   obtain a first selected field from said first record and a second selected field from said second record wherein said first selected field and said second selected field is obtained from said user;
   obtain a first data entry in said first selected field for said first record, said first data entry comprising a first string;
   tokenize said first string to retrieve a first tokenized data entry string;
   obtain a second data entry in said second selected field for said second record, said second data entry comprising a second string;
   tokenize said second string to retrieve a second tokenized data entry string;
   exclude at least one character from said first tokenized data entry string for utilization in said match that involves said first selected field and said second selected field;
   exclude at least one different character with respect to said at least one character from said second tokenized data entry string for utilization in said match that involves said first selected field and said second selected field;
   remove frequently used strings from said first tokenized data entry string and from said second tokenized data entry string;
   normalize data from said first selected field and from said second selected field to cleanse strings;
   accept a first list of tokens desired for said match to occur utilizing said first selected field;
   accept a second list of tokens desired for said match to occur utilizing said second selected field;
   assign weights to each token in said first list of tokens and each token in said second list of tokens;
   calculate a score for said match through summation of said weights for each token occurring in said first tokenized data entry string and said first record and for each token that occurs in said second tokenized data entry string and said second record;
   generate a group of similar records when said score is above a threshold;
   display said group of similar records to said user;
   learn at least one token that is relevant;
   learn at least one weight that results in a match; and
   learn at least one match criteria appropriate for said match for use in future matching based on user input regarding said score.

2. The computer program product of claim 1 wherein said computer readable program code is further configured to: said exclude further configured to present a list of excluded characters most often excluded in matches involving said first field.

3. The computer program product of claim 1 wherein said computer readable program code is further configured to: said remove said frequently used strings further configured to present a list of frequently used strings most often removed in matches involving said first field.

4. The computer program product of claim 1 wherein said computer readable program code is further configured to: said normalize said data from said first field further configured to present a list of tokens most often normalized in matches involving said first field.

5. The computer program product of claim 1 wherein said computer readable program code is further configured to: said assign said weights to each token in said first list of tokens further configured to present a list of tokens and corresponding weight values most often chosen in matches involving said first field.

6. The computer program product of claim 1 wherein said computer readable program code is further configured to: accept input that signifies if said first list of tokens is required to match in sequential order.

7. The computer program product of claim 1 wherein said computer readable program code is further configured to: accept input that signifies if said first list of tokens is required to match in non-sequential order.

8. The computer program product of claim 1 wherein said computer readable program code is further configured to: accept a weight value associated with a field.

9. The computer program product of claim 1 wherein said computer readable program code is further configured to: present a list of tokens previously used by a user to define a match involving said first selected field.

10. The computer program product of claim 1 wherein said computer readable program code is further configured to: alter a list of tokens presented to a user to define a match involving said first selected field when said user selects said second selected field.

11. A computer program product for adaptive matching of records in a data repository comprising:
- a computer usable memory medium having computer readable program code embodied therein wherein said computer readable program code comprises a matching executable unit configured to:
  - present at least one field common to a first record and a second record wherein said at least one field is used to perform a match between said first record and said second record and wherein said at least one field is presented to a user;
  - obtain a first selected field from said first record and a second selected field from said second record wherein said first selected field and said second selected field is obtained from said user;
  - obtain a first data entry in said first selected field for said first record, said first data entry comprising a first string;
  - tokenize said first string to retrieve a first tokenized data entry string;
  - obtain a second data entry in said second selected field for said second record, said second data entry comprising a second string;
  - tokenize said second string to retrieve a second tokenized data entry string;
  - exclude at least one character from said first tokenized data entry string for utilization in said match that involves said first selected field and said second selected field;
  - exclude at least one different character with respect to said at least one character from said second tokenized data entry string for utilization in said match that involves said first selected field and said second selected field;
  - remove frequently used strings from said first tokenized data entry string and from said second tokenized data entry string;
  - normalize data from said first selected field and from said second selected field to cleanse strings;
  - alter a list of tokens presented to a user to define said match involving said first selected field when said user selects said second selected field;
  - accept a first list of tokens desired for said match to occur utilizing said first selected field;
  - accept a second list of tokens desired for said match to occur utilizing said second selected field;
  - assign weights to each token in said first list of tokens and each token in said second list of tokens;
  - calculate a score for said match through summation of said weights for each token that occurs in said first tokenized data entry string and said first record and for each token that occurs in said second tokenized data entry string and said second record;
  - generate a group of similar records when said score is above a threshold;
  - display said group of similar records to said user; learn at least one token that is relevant;
  - learn at least one weight that results in a match; and
  - learn at least one match criteria appropriate for said match for use in future matching based on user input regarding said score.

12. The computer program product of claim 11 wherein said computer readable program code is further configured to: said exclude further configured to present a list of excluded characters most often excluded in matches involving said first field.

13. The computer program product of claim 11 wherein said computer readable program code is further configured to: said remove said frequently used strings further configured to present a list of frequently used strings most often removed in matches involving said first field.

14. The computer program product of claim 11 wherein said computer readable program code is further configured to: said normalize said data from said first field further configured to present a list of tokens most often normalized in matches involving said first field.

15. The computer program product of claim 11 wherein said computer readable program code is further configured to: said assign said weights to each token in said first list of tokens further configured to present a list of tokens and corresponding weight values most often chosen in matches involving said first field.

16. The computer program product of claim 11 wherein said computer readable program code is further configured to: accept input that signifies if said first list of tokens is required to match in sequential order.

17. The computer program product of claim 11 wherein said computer readable program code is further configured to: accept input that signifies if said first list of tokens is required to match in non-sequential order.

18. The computer program product of claim 11 wherein said computer readable program code is further configured to: accept a weight value associated with a field.

19. The computer program product of claim 11 further comprising: present a list of tokens previously used by a user to define a match involving said first selected field.

20. A computer system for adaptive matching of records in a data repository comprising:
- a computer system comprising a display device and a data repository, said computer system configured to:
  - present on said display device at least one field common to a first record and a second record wherein said at least one field is used to perform a match between said first record and said second record and wherein said at least one field is presented to a user on said display device;
  - obtain a first selected field from said first record and a second selected field from said second record wherein said first selected field and said second selected field is obtained from said user;
  - obtain a first data entry in said first selected field for said first record, said first data entry comprising a first string;
  - tokenize said first string to retrieve a first tokenized data entry string;
  - obtain a second data entry in said second selected field for said second record, said second data entry comprising a second string;
  - tokenize said second string to retrieve a second tokenized data entry string;

exclude at least one character from said first tokenized data entry string for utilization in said match that involves said first selected field and said second selected field;

exclude at least one different character with respect to said at least one character from said second tokenized data entry string for utilization in said match that involves said first selected field and said second selected field;

remove frequently used strings from said first tokenized data entry string and from said second tokenized data entry string;

normalize data from said first selected field and from said second selected field to cleanse strings;

accept a first list of tokens desired for said match to occur utilizing said first selected field;

accept a second list of tokens desired for said match to occur utilizing said second selected field;

assign weights to each token in said first list of tokens and each token in said second list of tokens;

calculate a score for said match through summation of said weights for each token that occurs in said first tokenized data entry string and said second record and for each token that occurs in said second tokenized data entry and said second record;

generate a group of similar records when said score is above a threshold;

display said group of similar records to said user;

learn at least one token that is relevant;

learn at least one weight that results in a match; and learn at least one match criteria appropriate for said match for use in future matching based on user input regarding said score.

* * * * *